United States Patent
Yamada (10) Patent No.: US 8,310,467 B2
(45) Date of Patent: Nov. 13, 2012

(54) OPTICAL-EMISSION-SIGNAL OUTPUT APPARATUS

(75) Inventor: Shoji Yamada, Konan (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1054 days.

(21) Appl. No.: 11/582,431

(22) Filed: Oct. 18, 2006

(65) Prior Publication Data
US 2007/0035504 A1    Feb. 15, 2007

Related U.S. Application Data

(63) Continuation-in-part of application No. PCT/JP2005/007222, filed on Apr. 14, 2005.

(30) Foreign Application Priority Data

Apr. 19, 2004    (JP) .................................. 2004-122742

(51) Int. Cl.
*G09G 3/36*    (2006.01)
(52) U.S. Cl. ....................................... 345/204
(58) Field of Classification Search .................. None
See application file for complete search history.

(56) References Cited

U.S. PATENT DOCUMENTS

| | | | |
|---|---|---|---|
| 3,697,955 A * | 10/1972 | Bryden et al. ................. | 345/26 |
| 4,862,196 A | 8/1989 | Umeda et al. | |
| 4,962,981 A | 10/1990 | Murakami et al. | |
| 5,115,328 A | 5/1992 | Kadono | |
| 5,121,138 A | 6/1992 | Schermer et al. | |
| 6,477,656 B1 * | 11/2002 | Takaki et al. ................. | 713/401 |

FOREIGN PATENT DOCUMENTS

| | | |
|---|---|---|
| JP | A 53-117440 | 10/1978 |
| JP | A 58-049963 | 3/1983 |
| JP | A 63-148275 | 6/1988 |
| JP | A 63-175817 | 7/1988 |
| JP | A 2-018065 | 1/1990 |
| JP | A 2-063847 | 3/1990 |
| JP | A 7-191271 | 7/1995 |
| JP | A 8-286132 | 11/1996 |
| JP | A 2000-246959 | 9/2000 |
| JP | B2 3121037 | 10/2000 |
| JP | A 2003-057586 | 2/2003 |

OTHER PUBLICATIONS

Jul. 13, 2010 Office Action issued in Japanese Patent Application No. 2004-122742 (with translation).

* cited by examiner

*Primary Examiner* — Tammy Pham
(74) *Attorney, Agent, or Firm* — Oliff & Berridge, PLC (57) ABSTRACT

There is provided an optical-emission-signal output apparatus for outputting an optical-emission signal specifying an optical-emission timing to an optical-emission unit for outputting light to an optical-scan unit for scanning incident light by resonance. The optical-emission-signal output apparatus comprises a frequency divider for dividing a master clock output at predetermined intervals, a delay-time setting unit for specifying one of a plurality of delay times, and a signal output unit for outputting the optical-emission signal in accordance with a result of division by the frequency divider and a delay time specified by the delay-time setting unit.

10 Claims, 6 Drawing Sheets

FIG. 9

OPTICAL-EMISSION-SIGNAL OUTPUT APPARATUS

BACKGROUND

1. Technical Field

The present invention relates to optical-emission-signal output apparatuses for specifying optical-emission timings, for use in image display apparatuses and the like.

2. Related Art

Figure 7:
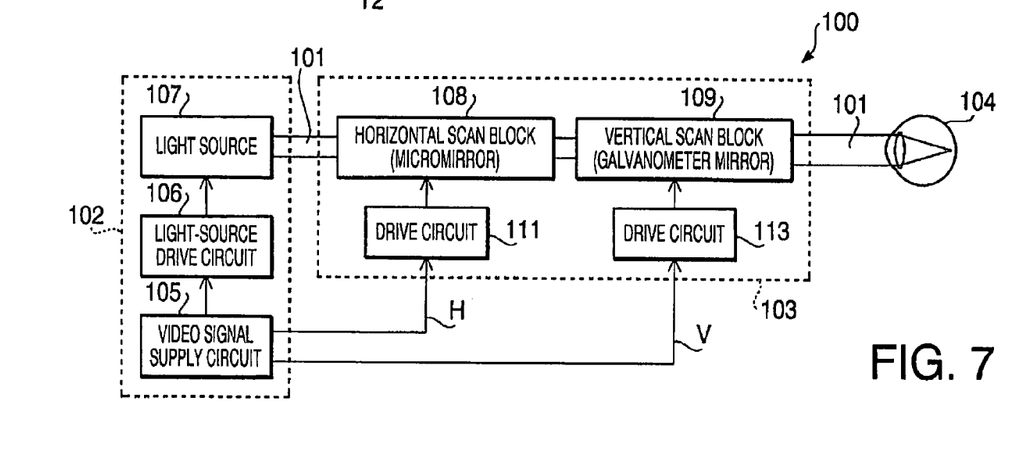
FIG. 7 is a block diagram showing a conventional image display apparatus.

FIG. 7 is a block diagram showing a conventional image display apparatus. The image display apparatus 100 includes an optical-emission unit 102 for outputting an optical beam 101 and an optical-scan unit 103 for scanning the optical beam 101 output from the optical-emission unit 102. The image display apparatus 100 is structured so as to display an image on the retina in an eye 104 of an observer, a screen, or the like, by means of the optical-scan unit 103 which scans the optical beam 101 on the retina in the eye 104, the screen, or the like.

The optical-emission unit 102 includes a video signal supply circuit 105, a light-source drive circuit 106, and a light source 107. The light-source drive circuit 106 drives the light source 107 in accordance with a video signal supplied from the video signal supply circuit 105, and the light source 107 outputs the optical beam 101 modulated by the video signal.

The optical-scan unit 103 has a horizontal scan block 108 and a vertical scan block 109. The horizontal scan block 108 scans light horizontally, as driven by a drive circuit 111. The vertical scan block 109 scans light vertically, as driven by a drive circuit 113. The drive circuit 111 drives a micromirror, provided as the horizontal scan block 108, so as to scan the optical beam 101 horizontally, in accordance with a horizontal synchronizing signal H supplied from the video signal supply circuit 105. The drive circuit 113 drives a galvanometer mirror, provided as the vertical scan block 109, so as to scan the optical beam 101 vertically, in accordance with a vertical synchronizing signal V supplied from the video signal supply circuit 105.

SUMMARY

Figure 8:
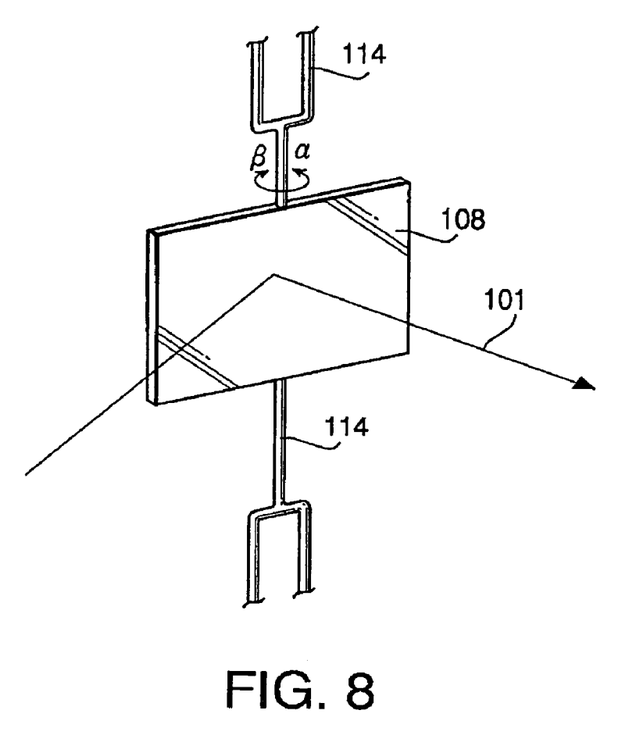
FIG. 8 is a perspective view of a conventional resonance-type scan block.

A so-called resonance-type horizontal scan block may be used as the horizontal scan block 108, as disclosed in Japanese Unexamined Patent Application Publication No. 2003-57586 (hereafter referred to as document 1). As shown in FIG. 8, the resonance-type horizontal scan block 108 has a micromirror 108 supported by two supporting members 114 and is structured to torsionally vibrate the micromirror 108 in the directions of the α-β arrows as the supporting members 114 are twisted. The micromirror 108 and the supporting members 114 form a mechanical resonance system, causing the torsional vibration of the micromirror 108 to continue.

As the micromirror 108 torsionally vibrates as described above, the optical beam 101 is reflected in the direction depending on the scan angle of the micromirror 108 and scans, thereby displaying an image on a screen or the like.

Figure 9:
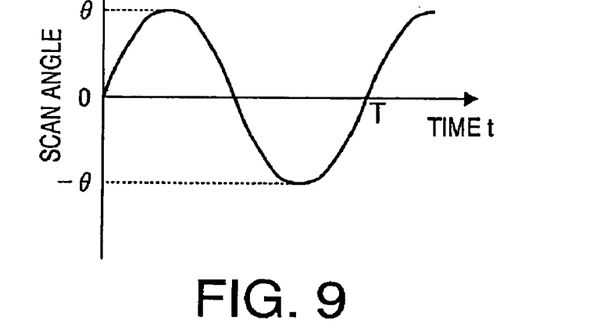
FIG. 9 is a view showing variations in scan angle over time, of the conventional resonance-type scan block.

The resonance-type horizontal scan block 108 has a capability of high-speed operation, but the angular scan speed of the optical beam 101 is not constant. The scan angle varies, as represented by a sinusoidal waveform shown in FIG. 9. Accordingly, if the pixel data forming an image is supplied at regular intervals to modulate light, the display image is distorted.

Japanese Unexamined Patent Application Publication No. Sho-53-117440 (hereafter referred to as document 2) proposes an invention for throwing an optical beam at a timing corresponding to the scan angle of the scan block. In the invention disclosed in document 2, the optical-emission timing is determined by dividing the cycle of a master clock, which is very short (high frequency) in comparison with the pixel display intervals, by a variable value.

With the method disclosed in document 2, degradation in picture quality is eliminated by the master clock of an extremely high frequency, which requires an expensive circuit component and high mounting technology.

In view of the problems of the prior art, the present invention has been made. An object of the present invention is to provide an optical-emission-signal output apparatus that can make degradation in picture quality obscure and can be provided at a low price.

Provided toward achievement of the object described above from one aspect of the present invention is an optical-emission-signal output apparatus for outputting an optical-emission signal specifying an optical-emission timing to an optical-emission unit for outputting light to an optical-scan unit for scanning incident light by resonance. The optical-emission-signal output apparatus includes a frequency divider that divides a master clock output at predetermined intervals, a delay-time setting unit that specifies one of a plurality of delay times, and a signal output unit that outputs an optical-emission signal in accordance with a result of division obtained by the frequency divider and a delay time specified by the delay-time setting unit.

According to this structure, the optical-emission signal is generated by selectively delaying a signal obtained by dividing the master clock, so that the optical-emission timing is corrected, and degradation in picture quality can be suppressed without increasing the master clock frequency extremely.

Provided from another aspect of the present invention is an image display apparatus including the optical-emission-signal output apparatus structured as described earlier, an optical-emission unit that outputs light, an optical-scan unit that scans incident light from the optical-emission unit by resonance, and a projection unit that projects light scanned by the optical-scan unit.

In the image display apparatus, the optical-emission-signal output apparatus producing the effect as described above controls the optical-emission timing of the optical-emission unit.

DETAILED DESCRIPTION

First Embodiment

Figure 1:
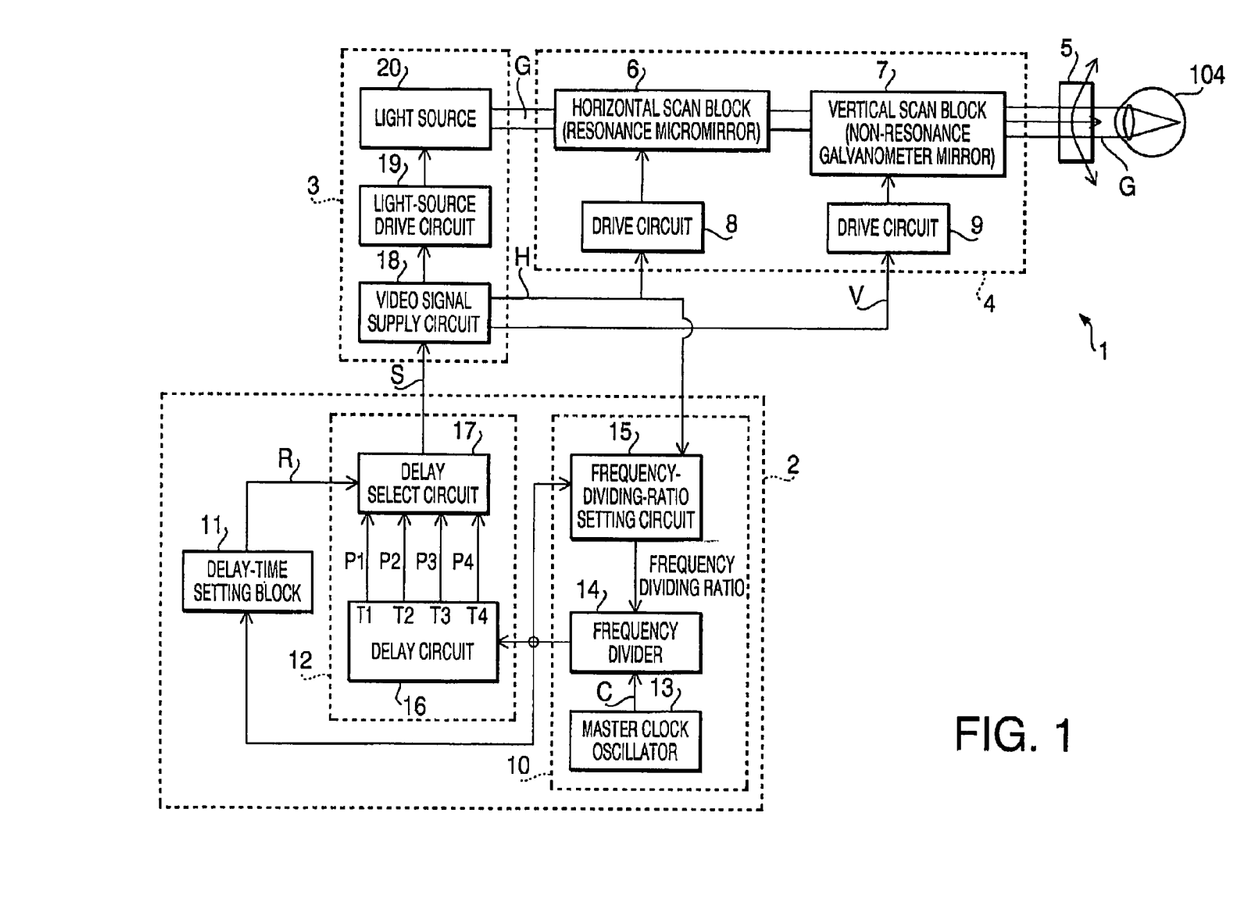
FIG. 1 is a block diagram showing an image display apparatus according to a first embodiment of the present invention, including an optical-emission-signal output apparatus.

FIG. 1 is a block diagram showing an image display apparatus 1 according to a first embodiment of the present invention. The image display apparatus 1 is an image display apparatus provided with an optical-emission-signal output apparatus 2.

The image display apparatus 1 includes an optical-emission unit 3 for outputting light, an optical-scan unit 4 for scanning light output from the optical-emission unit 3, and a projection unit 5 for projecting light scanned by the optical-scan unit 4 onto the retina in an eye 104 of the observer, a screen, or the like. The image display apparatus 1 also includes the optical-emission-signal output apparatus 2.

The optical-scan unit 4 includes a horizontal scan block 6 and a vertical scan block 7. The horizontal scan block 6 scans light output from the optical-emission unit 3 horizontally, as driven by a drive circuit 8. The vertical scan block 7 scans light output from the optical-emission unit 3 vertically, as driven by a drive circuit 9. The drive circuit 8 controls the horizontal scan block 6 in accordance with a horizontal synchronizing signal H input from a video signal supply circuit 18. The drive circuit 9 controls the vertical scan block 7 in accordance with a vertical synchronizing signal V input from the video signal supply circuit 18.

The horizontal scan block 6 is structured as a resonance-type block. Accordingly, the scan angle of the horizontal scan block 6 varies, as represented by a sinusoidal wave, as in the conventional resonance-type horizontal scan block 108 (see FIG. 8). The horizontal scan block 6 can be structured by a torsionally vibrating micromirror or the like. The vertical scan block 7 can be structured by a torsionally vibrating galvanometer mirror or the like.

The optical-emission unit 3 is an optical device having at least a function to output light. The optical-emission unit 3 may also be structured to modulate light by a video signal and output this light as an image light G. In the first embodiment, the optical-emission unit 3 is described as a device for outputting light as the image light G. The specific structure of the optical-emission unit 3 will be described later.

The optical-emission-signal output apparatus 2 outputs an optical-emission signal S to the optical-emission unit 3 each time the scan angle increases by a certain amount. The optical-emission signal S given to the optical-emission unit 3 is a signal specifying a timing at which the optical-emission unit 3 outputs the image light G to the optical-scan unit 4. The optical-emission-signal output apparatus 2 controls the timing at which the optical-emission unit 3 outputs the image light G, thereby controlling the illumination of the image light G so as to make degradation in image (especially distortion of the image) obscure.

With reference to FIGS. 2(a) and 2(b), the output timing of the optical-emission signal S from the optical-emission-signal output apparatus 2 will be described. As shown in FIG. 2(a), the optical-emission-signal output apparatus 2 outputs the optical-emission signal S after a lapse of one of four delay times T1, T2, T3, and T4 from the reference timings K1, K2, K3, K4, and so on obtained by dividing a master clock C.

The reference timings K1, K2, K3, K4, and so on are determined by dividing the master clock C output at certain intervals. The intervals of the reference timings K1, K2, K3, K4, and so on vary when the frequency dividing ratio is changed to 4, M, and N, as shown in FIG. 2(b). The frequency dividing ratio is changed to provide nearly constant intervals between the scan angles of the horizontal scan block 6 at the output timings of the optical-emission signal S.

Figure 2:
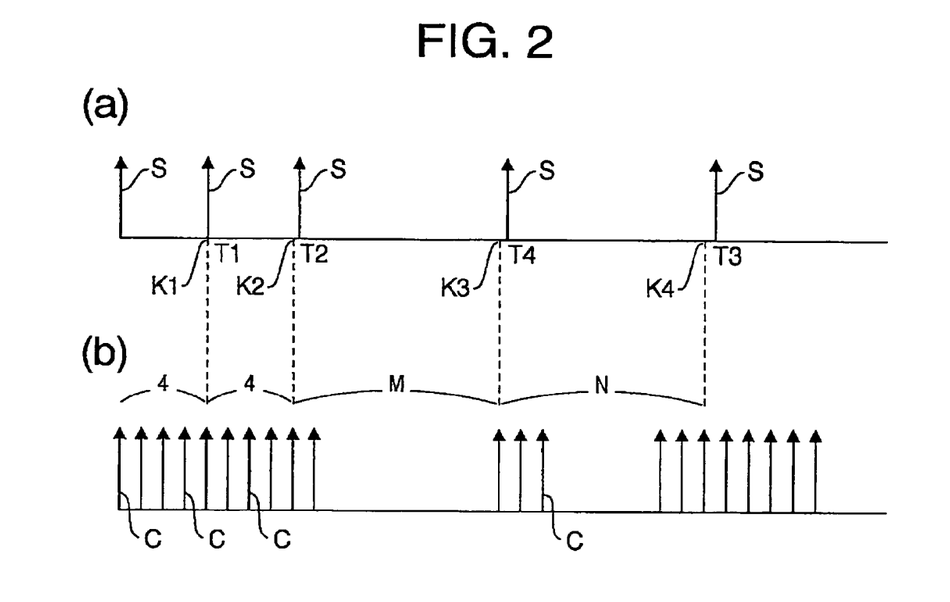
FIGS. 2(a) and 2(b) illustrate signal output timing in the first embodiment.
Figure 3:
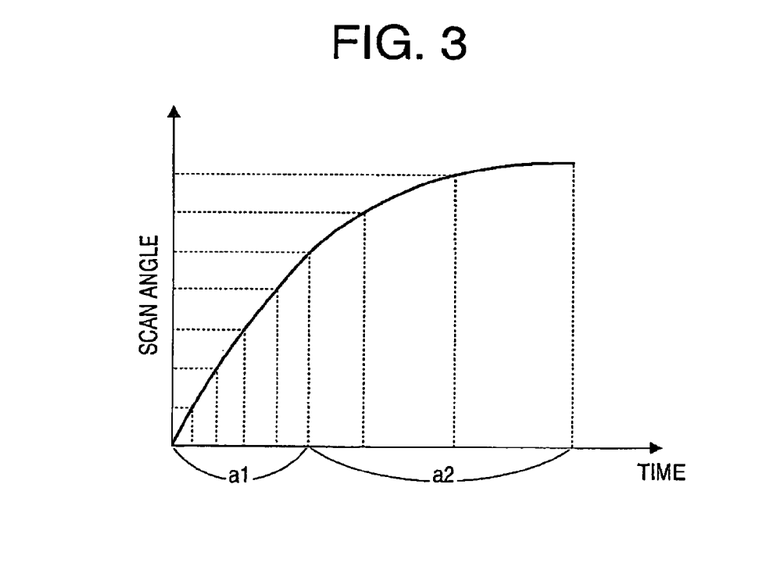
FIG. 3 is a view showing a scan angle of a resonance-type scan block in the first embodiment.

The scan angle of the resonance-type horizontal scan block 6 varies, as represented by a sinusoidal waveform with respect to the time base, a shown in FIG. 3. The angular scan speed of the horizontal scan block 6 is high in the a1 segment of the sinusoidal wave and is low in the a2 segment. The vertical axis in FIG. 3 indicates the scan angle, and the horizontal axis indicates time. Because the angular scan speed of the horizontal scan block 6 is high in the a1 segment, the frequency dividing ratio of the master clock C is set to a small value, so that the reference timings K1, K2, K3, K4, and so on shown in FIG. 2 are given at a high frequency for the purpose of increasing the output frequency of the optical-emission signal S. Because the angular scan speed is low in the a2 segment shown in FIG. 3, the frequency dividing ratio of the master clock C is set to a great value, so that the reference timings K1, K2, K3, K4, and so on are given at a low frequency for the purpose of decreasing the output frequency of the optical-emission signal S. The frequency dividing ratio of the master clock C is changed to specify the scan angles of the horizontal scan block 6 corresponding to the reference timings at almost constant intervals. It is preferable that the reference timings K1, K2, K3, K4, and so on be specified in such a manner that the light to be scanned is thrown to a position not exceeding a desired illumination position in the scan direction. More specifically, it is desired that the output timings of the optical-emission signal S, or the output timings of the image light G, be specified in such a manner that the light to be scanned is thrown to a position not exceeding the desired illumination position in the scan direction (in other words, the magnitude of the frequency dividing ratio of the master clock C be limited).

Any delay time selected from a plurality of predetermined delay times T1, T2, T3, and T4 is specified.

The delay times T1, T2, T3, and T4 differ from one another by a value obtained by dividing the cycle "t" of the master clock by an integer "n", or t/n. If the integer "n" is set to 4, or the number of different delay times, the delay time T1 can be set to 0, the delay time T2 can be set to 1t/4, the delay time T3 can be set to 2t/4, and the delay time T4 can be set to 3t/4. The delay time T1 being set to 0 means that the output timing of the optical-emission signal S is not delayed from the reference timings K1, K2, K3, and K4 and agrees with the reference timings K1, K2, K3, and K4.

The structure of the optical-emission-signal output apparatus 2 will be described next with reference to FIG. 1. The optical-emission-signal output apparatus 2 includes a reference-timing output block 10, a delay-time setting unit 11, and a signal output unit 12. The optical-emission-signal output apparatus 2 outputs the optical-emission signal S.

The reference-timing output block 10 includes a master clock oscillator 13, a frequency divider 14, and a frequency-dividing-ratio setting circuit 15. The master clock oscillator 13 generates the master clock C at a certain frequency. The master clock oscillator 13 includes a crystal oscillator, for instance. The frequency divider 14 divides the frequency of the master clock C generated by the master clock oscillator 13. The frequency-dividing-ratio setting circuit 15 is a device for specifying any frequency dividing ratio of the frequency divider 14.

The frequency divider 14 divides the master clock C output from the master clock oscillator 13 by the frequency dividing ratios specified by the frequency-dividing-ratio setting circuit 15, generating reference timings K1, K2, K3, K4, and so on.

The frequency-dividing-ratio setting circuit 15 stores such a series of frequency dividing ratios that the scan angles of the horizontal scan block 6 are given at nearly constant intervals, as described above. The frequency-dividing-ratio setting circuit 15 supplies the first value of the series of frequency dividing ratios in synchronization with the horizontal synchronizing signal H sent from the video signal supply circuit 18, then supplies the frequency divider 14 with the next frequency dividing ratio from the same series each time the reference timing is output. Through this operation of the frequency-dividing-ratio setting circuit 15, the reference timings K1, K2, K3, and K4 are generated.

The signal output unit 12 outputs the optical-emission signal S after a lapse of one of the delay times T1, T2, T3, and T4 from the reference timings K1, K2, K3, K4, and so on, as shown in FIG. 2(a). The signal output unit 12 may include a delay circuit 16 and a delay select circuit 17. The delay circuit 16 outputs four optical-emission signals S after a lapse of delay times T1, T2, T3, and T4 from each of the reference timings K1, K2, K3, K4, and so on. The delay select circuit 17 selects one of the four optical-emission signals S and outputs the selected optical-emission signal S to the optical-emission unit 3. The delay select circuit 17 selects one of the four optical-emission signals S in accordance with a selection signal R input from the delay-time setting unit 11 and outputs the selected optical-emission signal S to the optical-emission unit 3.

The delay-time setting unit 11 can be configured by a pseudo-random pulse generator. The delay-time setting unit 11 outputs a selection signal R for selecting one of the four optical-emission signals S at random. The signal output unit 12 may be structured to output the four optical-emission signals S from four terminals P1, P2, P3, and P4 respectively and to select one optical-emission signal S by selecting one of the four terminals P1, P2, P3, and P4 in accordance with the selection signal R. FIG. 2(b) shows that the delay time T1 is set for the reference timing K1, the delay time T2 is set for the reference timing K2, the delay time T4 is set for the reference timing K3, and the delay time T3 is set for the reference timing K4.

The specific structure of the optical-emission unit 3 will be described with reference to FIG. 1 again. The optical-emission unit 3 includes a video signal supply circuit 18, a light-source drive circuit 19, and a light source 20. The light-source drive circuit 19 drives the light source 20 in accordance with a video signal supplied from the video signal supply circuit 18, and an image light G modulated by the video signal is output.

The operation of the image display apparatus 1 structured as described above will next be described. The video signal supply circuit 18 of the optical-emission unit 3 receives the optical-emission signal S and drives the light-source drive circuit 19, so that the light source 20 outputs the image light G to the optical-scan unit 4. The video signal supply circuit 18 also drives the drive circuits 8 and 9, so that the horizontal scan block 6 of the optical-scan unit 4 scans the image light G horizontally, and the vertical scan block 7 scans the image light G vertically. This operation causes the image light G to be thrown onto the retina in the eye 104 of the observer or the like.

The video signal supply circuit 18 of the optical-emission unit 3 drives the light-source drive circuit 19 and the drive circuit 8 and 9 as described above, and also outputs the horizontal synchronizing signal to the frequency-dividing-ratio setting circuit 15. When the horizontal synchronizing signal is input, the frequency-dividing-ratio setting circuit 15 specifies the first value of the series of frequency dividing ratios as the frequency dividing ratio of the frequency divider 14. It is assumed that a frequency dividing ratio of 4 is specified. When the frequency dividing ratio of 4 is specified, the reference timing K1 is determined, as shown in FIG. 2.

It is also assumed that the delay select circuit 17 selects the terminal P1 in accordance with the selection signal R sent from the delay-time setting unit 11. Then, the signal output unit 12 outputs the optical-emission signal S to the optical-emission unit 3 after a lapse of the delay time T1 from the reference timing K1, as shown in FIG. 2(a). Because the delay time T1 is zero here, the signal output unit 12 outputs the optical-emission signal S to the optical-emission unit 3 in synchronization with the reference timing K1. The optical-emission unit 3 outputs the image light G to the optical-scan unit 4 at a timing synchronized with the reference timing K1. The optical-scan unit 4 throws the image light G onto the retina in the eye 104 of the observer or the like, as described earlier. The signal output unit 12 then outputs the optical-emission signal S after a lapse of the delay time T2 from the reference timing K2 in the same way, as shown in FIG. 2.

The frequency divider 14 further divides the master clock C by given frequency dividing ratios and generates the reference timings K3 and K4 in the same way. The signal output unit 12 outputs the optical-emission signal S to the optical-emission unit 3 after a lapse of delay times T4 and T3 respectively from the reference timings K3 and K4. When the optical-emission signal S is input, the optical-emission unit 3 outputs the image light G to the optical-scan unit 4. The optical-scan unit 4 scans the image light G toward the retina in the eye 104 of the observer or the like, thereby displaying the image.

In the first embodiment, the output timing of the optical-emission signal S can be controlled by specifying an appropriate frequency dividing ratio for generating reference timing signals and selecting the delay time T1, T2, T3, or T4 at random. As a result, although the scan angle varies along a sinusoidal waveform, the scan angles corresponding to the optical-emission timings are given at nearly constant intervals, and the periodicity and regularity of timing errors are eliminated. Accordingly, a satisfactory image can be displayed with distortions and other degradation in picture quality made obscure.

Figure 4:
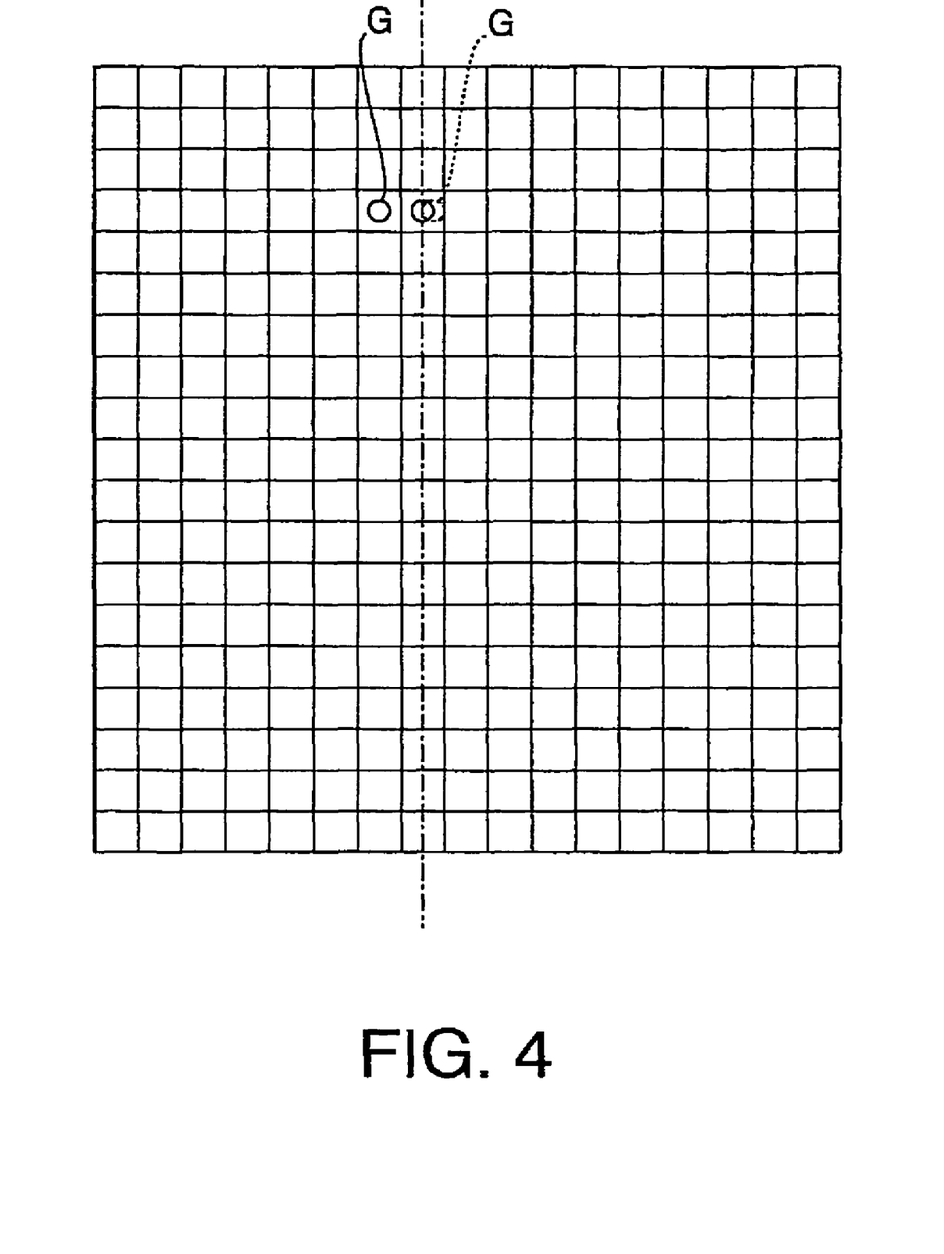
FIG. 4 is a view showing an image light illumination state in the first embodiment.

FIG. 4 shows a state in which the image light G output from the optical-emission unit 3 is projected onto a screen or the like. When the delay-time setting unit 11 specifies a delay time at random, the optical-emission unit 3 throws the image light G in synchronization with the optical-emission signal S output after a lapse of delay time T1, T2, T3, or T4 specified at random, from the reference timings K1, K2, K3, K4, and so on, as described earlier. Accordingly, the image light G may be thrown to a suitable position, as indicated by a solid line, and the image light G may be thrown to a position deviating from the suitable position (shown by the solid line), as indicated by a broken line, in the figure. The maximum amount of deviation corresponds to the cycle of the master clock C. If no delay is given here, the deviation would be repeated each time horizontal scanning is repeated, and the degraded pattern as indicated by a one-dot chain line would be easily recognized visually. When delay times T1, T2, T3, and T4, which are shorter than the cycle of the master clock C, are added at random, the deviation will not appear with periodicity or regularity. Accordingly, each position where the image light G is thrown with a deviation from the suitable position would not appear linearly, unlike the pattern indicated by the one-dot chain line in the figure, and the deviation would be obscure to the naked eye.

Second Embodiment

Figure 5:
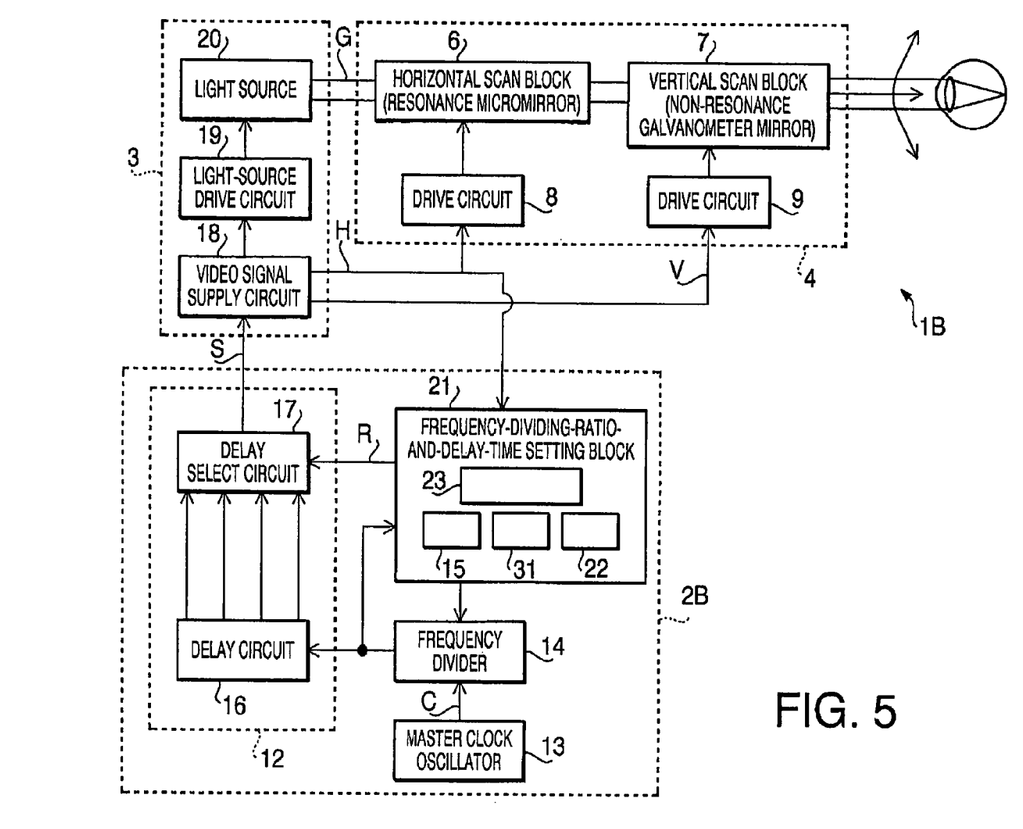
FIG. 5 is a block diagram showing an image display apparatus according to a second embodiment, including an optical-emission-signal output apparatus.
Figure 6:
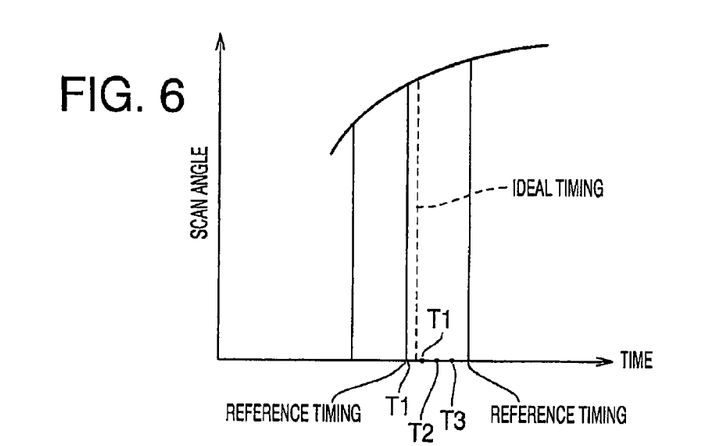
FIG. 6 is a view showing variations in scan angle over time, of a resonance-type scan block of the second embodiment.

FIG. 5 is a block diagram showing an image display apparatus 1B according to a second embodiment of the present invention. The image display apparatus 1B is an image display apparatus provided with an optical-emission-signal output apparatus 2B. In FIG. 5, components equivalent to those of the image display apparatus 1 shown in FIG. 1 are denoted by the same reference symbols. A description of the components equivalent to those in the first embodiment will be omitted. The image display apparatus 1B of the second embodiment is distinguished by having a frequency-dividing-ratio-and-delay-time setting unit 21. The frequency-dividing-ratio-and-delay-time setting unit 21 includes a frequency-dividing-ratio setting circuit 15, a delay-time setting unit 31, a memory 22, and a control block 23 for controlling the frequency-dividing-ratio setting circuit 15, the delay-time setting unit 31, and the memory 22. The frequency-dividing-ratio setting circuit 15 has the same structure as the frequency-dividing-ratio setting circuit 15 of the first embodiment. As shown in FIG. 6, the memory 22 stores such a series of delay selection signals that the optical-emission signal S is output at timings closest to optimum timings.

When the video signal supply circuit 18 supplies a horizontal synchronizing signal H to the frequency-dividing-ratio-and-delay-time setting unit 21, the frequency-dividing-ratio setting circuit 15 specifies the first value of a series of frequency dividing ratios in a frequency divider 14, and the delay-time setting unit 31 specifies the first value of the series of delay selection signals in a delay select circuit 17. After that, values of the series of frequency dividing ratios and the series of delay selection signals are successively specified in the frequency divider 14 and the delay select circuit 17 respectively each time a reference timing signal is output, and the optical-emission signal S is successively generated accordingly. An error of the timing of the generated optical-emission signal S with respect to the ideal timings, which set the corresponding scan angles at constant intervals, is ¼ of the master clock cycle at the greatest. Accordingly, the precision of the optical-emission timing is equivalent to that in the simple frequency dividing method in which the master clock frequency is multiplied by 4.

With the optical-emission-signal output apparatus 2 or 2B of the first or second embodiment, the optical-emission signal is generated by dividing the master clock and giving a delay selectively, so that the optical-emission timing can be corrected, and degradation in image quality can be suppressed without increasing the frequency of the master clock extremely. In the image display apparatus 1 or 1B, the optical-emission-signal output apparatus operating as described above controls the optical-emission timing of the optical-emission unit.

In the first and second embodiments described above, the four delay times T1, T2, T3, and T4 differ from one another by a value obtained by dividing the cycle "t" of the master clock C by 4. The delay times T1, T2, T3, and T4 may differ from one another by a value obtained by dividing the cycle "t" of the master clock C by another integer. For instance, a value obtained by dividing the cycle "t" of the master clock C by 3 or 5 may be used to specify the delay times. The number of different delay times may increase or decrease, depending on the value used to divide the cycle "t" of the master clock C.

In the embodiments described above, the horizontal scan block 6 scans the image light G by resonance, but the horizontal scan block 6 may have a different structure. Any type of device that scans the image light G by torsional vibration can be used as the horizontal scan block 6.

In one embodiment of the present invention, the optical-emission-signal output apparatus may have a frequency-dividing-ratio setting circuit that specifies the frequency dividing ratio of the frequency divider. In that case, the signal output unit outputs the optical-emission signal after a lapse of a delay time specified by the delay-time setting unit, from a timing obtained by dividing the master clock by the frequency divider in accordance with the frequency dividing ratio specified by the frequency-dividing-ratio setting circuit.

In this structure, the timing at which the optical-emission unit outputs light can be controlled by adjusting the delay time of the signal obtained by dividing the master clock.

In one embodiment of the present invention, the frequency-dividing-ratio setting circuit may be configured to specify the frequency dividing ratio of the frequency divider in association with such a timing that the scanned light is thrown to a position not exceeding a desired illumination position in the scanning direction.

This structure can suppress light output in a position delayed from the desired illumination position.

In one embodiment of the present invention, the delay-time setting unit may be structured to specify one of a plurality of delay times at random.

This structure will eliminate periodicity and regularity from errors in optical-emission timing, and degradation in image quality can be suppressed more clearly.

In one embodiment of the present invention, the delay-time setting unit may be structured to specify a delay time corresponding to such a timing that the scanned light is thrown to a position closest to the desired illumination position in the scanning direction.

This structure allows the optical-emission unit to output light at a timing corresponding to the position closest to the desired illumination position, and can suppress degradation in image quality in the same way as when the frequency of the master clock is increased.

In one embodiment of the present invention, the delay-time setting unit may be structured to specify a delay time that is not delayed from the timing obtained by dividing the master clock by the frequency divider according to the frequency dividing ratio specified by the frequency-dividing-ratio setting circuit.

In this structure, the optical-emission unit can output light at a timing obtained by dividing the master clock.

In one embodiment of the present invention, the delay-time setting unit may be structured to specify the plurality of delay times differing from one another by a value obtained by dividing the cycle of the master clock by an integer.

In this structure, distributed delay times are specified by dividing the cycle of the master clock by an integer, and degradation in image quality can be suppressed more effectively.

In one embodiment of the present invention, the cycle of the master clock is divided by an integer of 3, 4, or 5.

In this structure, a delay time can be specified by selecting an integer from 3, 4, or 5.

In one different embodiment of the present invention, the optical-scan unit may be structured to scan incident light by torsional vibration.

What is claimed is:

1. An optical-emission-signal output apparatus for outputting an optical-emission signal specifying an optical-emission timing to an optical-emission unit for outputting light to an optical-scan unit which scans sinusoidally incident light with respect to a time axis by resonance, the optical-emission-signal output apparatus comprising:

a master clock generator that outputs a master clock at a predetermined intervals;

a frequency divider that divides the master clock outputted by the master clock generator;

a delay-time setting unit that specifies one of a plurality of delay times; and a signal output unit that corrects timing of the optical-emission signal based on a result of division by the frequency divider and a delay time specified by the delay-time setting unit and outputs the optical emission signal, wherein by adjusting a frequency dividing ratio of the master clock, intervals between reference timings are adjusted to be non-constant and thereby scan angle of the light from the optical-scan unit changes at a nearly constant angle at each time the optical emission signal is outputted.

2. The optical-emission-signal output apparatus according to claim 1, further comprising:

a frequency-dividing-ratio setting circuit that specifies the frequency dividing ratio for the frequency divider, wherein the signal output unit outputs the optical-emission signal after a lapse of the delay time specified by the delay-time setting unit, from timing obtained by dividing the master clock by the frequency divider according to the frequency dividing ratio specified by the frequency-dividing-ratio setting circuit.

3. The optical-emission-signal output apparatus according to claim 2, wherein the frequency-dividing-ratio setting circuit gives the frequency divider the frequency dividing ratio corresponding to such a timing that scanned light is thrown to a position not exceeding a desired illumination position in a scanning direction.

4. The optical-emission-signal output apparatus according to claim 1, wherein the delay-time setting unit specifies one of the plurality of delay times at random.

5. The optical-emission-signal output apparatus according to claim 1, wherein the delay-time setting unit specifies a delay time corresponding to such a timing that scanned light is thrown to a position closest to a desired illumination position in a scanning direction.

6. The optical-emission-signal output apparatus according to claim 2, wherein the delay-time setting unit can specify a delay time that is not delayed from the timing obtained by dividing the master clock by the frequency divider in accordance with the frequency dividing ratio specified by the frequency-dividing-ratio setting circuit.

7. The optical-emission-signal output apparatus according to claim 1, wherein the delay-time setting unit can specify the plurality of delay times differing from one another by a value obtained by dividing the cycle of the master clock by an integer.

8. The optical-emission-signal output apparatus according to claim 7, wherein the integer by which the cycle of the master clock is divided is any of 3, 4, and 5.

9. An image display apparatus comprising:

an optical-emission-signal output apparatus according to claim 1;

an optical-emission unit that outputs light;

an optical-scan unit that scans sinusoidally incident light from the optical-emission unit by resonance; and a projection unit that projects light scanned by the optical-scan unit.

10. The image display apparatus according to claim 9, wherein the optical-scan unit scans the incident light by torsional vibration.

* * * * *